June 23, 1964   R. L. LAING   3,137,968
HERBICIDE-COATED NAIL FOR KILLING TREES
Filed Aug. 24, 1960
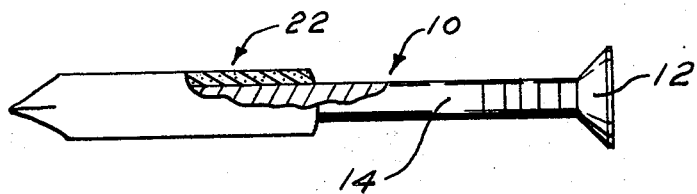
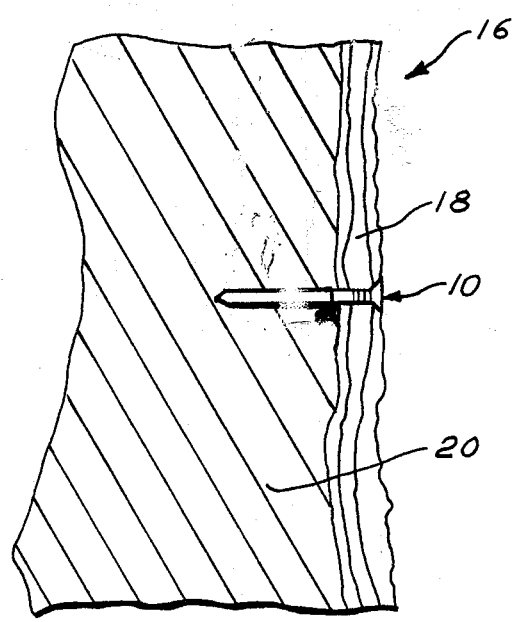
INVENTOR:
Robert L. Laing

United States Patent Office 3,137,968
Patented June 23, 1964

3,137,968
HERBICIDE-COATED NAIL FOR KILLING TREES
Robert Louis Laing, Fort Worth, Tex.
(3527 Aquila Ave. S., Minneapolis 26, Minn.)
Filed Aug. 24, 1960, Ser. No. 51,506
9 Claims. (Cl. 47—57.5)

This invention relates to a device for killing trees. More particularly my invention relates to a mixture of herbicide and glue which is coated over the shank of a carpenter's nail to be driven into the trunk of a tree for the purpose of implanting herbicide materials directly into the growing plant tissue and into the sap stream.

This application is a continuation-in-part of application Serial No. 807,275, filed April 20, 1959, now Patent No. 3,074,207, granted January 22, 1963, and of abandoned application Serial No. 672,488, filed July 17, 1957.

Heretofore and up to the present time two methods and devices have been in popular use for killing trees. The most common method has been the use of herbicides in sprays. The second method and device is a cylindrical tank which contains the herbicide, with a hand operated piston on one end, and a large hypodermic-like needle at the other. With this device, the operator forces the needle into the tree trunk and operates the piston, which forces herbicide into the tree.

Serious disadvantages are inherent in these methods and devices, and deleterious effects result therefrom.

When using sprays, it is difficult to kill trees selectively because the spray invariably drifts or is blown by the wind to nearby trees and plants, which are in turn damaged or killed outright. Furthermore sprays are not absorbed by the tree's circulatory system without the addition of very expensive absorption agents. Therefore the roots are not always deadened, and trees often revive from this treatment and continue growing.

Using the tank device is very difficult. The wood often plugs up the inside of the hollow needle and is quite difficult to remove. In addition, the tank is heavy and bulky; not as portable as my device. A further disadvantage is that a large percentage of the herbicide does not remain in the tree, but rather runs down the side of the tree, causing considerable waste. Since most of the damage is achieved, in fact, by the portion of herbicide that ran down the outer bark, the dying process is much slower than by my method. Whereas the above method takes from one to several weeks to even wilt the leaves, the leaves from trees treated with my device are completely wilted in one day.

It is, therefore, a principal object of the present invention to provide a quick, easy, and inexpensive method and device for killing trees.

It is a further object to provide a highly selective means, whereby neighboring trees and plants are not injured.

It is an important object to provide a means whereby the whole tree will be deadened, from the top of the tree down to the extreme fibres of the roots.

Other objects of this invention will be apparent to those skilled in the art upon considering the following description and appended drawings:

In the drawings:

FIGURE 1 shows a nail with a coating, partly in section, thereon.

FIGURE 2 shows a partial cross-section of a tree trunk with the nail therein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

FIGURE 1 illustrates a preferred embodiment of the present invention. The apparatus of FIG. 1 may be in the form of a nail, generally designated as 10, comprising a head 12 and a shank 14. The shank 14 may be plain, as is shown in FIG. 1, or it may be ring shanked as in common shingle nails or otherwise serrated for the purpose of holding extra quantities of tree treating substance. The surface of the shank 14 is coated with a tree treating substance 22. The tree treating substance is comprised of approximately 50% dry water soluble salts of herbicide, fungicide, insecticide, or the like and 50% dry water soluble glue or affixative.

It is of note that the characteristics of the tree treating substance referred to here and which now makes it possible to treat trees by injection where past attempts have been relatively unsuccessful, is that the tree treating substance is dry, so that it can penetrate through the bark 18 of the tree 16 without being scraped off the implanting device 10; the tree treating substance 22 is water soluble so that it will be dissolved by the sap flowing through the cambium layer 20 of the tree; the tree treating substance is further characterized as being a systemic, that is, capable of remaining in the plant system for the remainder of the plant's lift without being deposited, precipitated or lodged; and it is capable of translocation, or of being transported from place to place in the tree for the remainder of the life of the tree. The technical name for such a substance is translocated systemic.

Since it is the intent of this invention to have the herbicide circulated throughout the tree's system, water soluble herbicides have been chosen. Of these, arsenic acid, borax and sodium chlorate, ammonium thiocyanate, sodium thiocyanate, ammonium sulfamate, 2,4-dichlorophenoxyacetic acid, and sodium 4-chloro-2-methyl-phenoxyacetate are the most desirable, although there are many more herbicides which could be used for the same purpose.

In each case the mixture is approximately half herbicide and half glue. The device is more effective if water soluble glue is used. After these are mixed, common nails, or preferably ring-shanked shingle nails are dipped into the mixture and then permitted to dry. The resultant product is driven into the trunks of unwanted trees. The sap in the tree dissolves the coating on the nail and carries the herbicide off to circulate throughout the tree's system.

The same method was tried using staples and a stapling machine instead of nails and the results were equally effective.

It is apparent that those skilled in the art can conceive of the use of different herbicides or affixatives or implanting devices, or of a different ratio of herbicide to affixative, or of different methods of applying the harbicide to the implanting device without departing from the original meaning or configuration as I developed it, which is as follows:

As thus described, the method and device of the present invention is characterized as an improved composite unit that consists of the combination of a herbicide for killing trees, an affixative such as water soluble glue, and a solid implanting device, such as a nail.

Having thus described my invention, I claim:

1. A device for killing trees characterized as a mixture of 50% dry, water soluble herbicide capable of being translocated throughout the plant system and 50% affixative coated on a nail.

2. A device for killing trees composed of 50% dry, water soluble herbicide capable of being translocated throughout the plant system and 50% water soluble affixative coated on a ring-shanked shingle nail.

3. A device for killing trees composed of 50% arsenic acid and 50% water soluble affixative coated on a ring shanked shingle nail.

4. A device for killing trees composed of 25% borax, 25% sodium chlorate, and 50% water soluble affixative coated on a ring-shanked nail.

5. A device for killing trees composed of 50% sodium thiocyanate and 50% water soluble affixative coated on a ring-shanked nail.

6. A device for killing trees composed of 50% ammonium thiocyanate and 50% water soluble affixative coated on a ring-shanked nail.

7. A device for killing trees composed of 50% ammonium sulfamate and 50% water soluble affixative coated on a ring shanked nail.

8. A device for killing trees composed of 50% 2,4-dichlorophenoxyacetic acid and 50% water soluble affixative coated on a ring-shanked nail.

9. A device for killing trees composed of 50% sodium 4-chloro-2-methyl-phenoxyacetate and 50% water soluble affixative coated on a ring-shanked nail.

References Cited in the file of this patent

UNITED STATES PATENTS

| | | |
|---|---|---|
| 75,560 | McKenzie | Mar. 17, 1868 |
| 970,375 | Hoskins | Sept. 13, 1910 |
| 2,846,817 | Haislet | Aug. 12, 1958 |

FOREIGN PATENTS

| | | |
|---|---|---|
| 545,467 | Belgium | Mar. 15, 1956 |
| 388,566 | Germany | Jan. 15, 1924 |
| 786,083 | Great Britain | Nov. 13, 1957 |

OTHER REFERENCES

Chandler: "Little-Leaf or Rosette of Fruit Trees," published May 1935 in Proceedings of the American Society for Horticultural Science for 1934, vol. 32, pages 11 through 19.

Dawkins: "Trials of Non-Toxic Arboricides...," published September 1953 in Empire Forestry Review (London, England), vol. 32, No. 3, pages 253 through 256.

Fryer: "The Role of Arboricides in Bush and Forest Eradication," published February 1955 in Journal of the Science of Food and Agriculture, vol. 6, No. 2, pages 73 through 78.

Condensed Chemical Dictionary, Fifth Edition, published by Reinhold (New York) 1956, page 1169.

American Nurseryman, vol. 106, No. 8, Oct. 15, 1957, pages 100, 101, 102, article: "Principles Involved in Transplanting Nursery Stock."

"Method of Weed Control" (Helgeson), published by Food and Agriculture Organization of the United Nations (Rome, Italy), 1957, pages 29, 86, 87, 88, 159, 162, 187.